United States Patent
Lee

(10) Patent No.: US 9,776,553 B2
(45) Date of Patent: Oct. 3, 2017

(54) STEPPING MOTOR

(71) Applicant: LG INNOTEK CO., LTD., Seoul (KR)

(72) Inventor: Su Hyoung Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 268 days.

(21) Appl. No.: 14/683,758

(22) Filed: Apr. 10, 2015

(65) Prior Publication Data
US 2015/0303783 A1    Oct. 22, 2015

(30) Foreign Application Priority Data

Apr. 22, 2014  (KR) .................. 10-2014-0048038

(51) Int. Cl.
| | |
|---|---|
| *B60Q 1/076* | (2006.01) |
| *H02K 37/00* | (2006.01) |
| *H02K 37/24* | (2006.01) |
| *H02K 21/14* | (2006.01) |
| *H02K 7/06* | (2006.01) |
| *H02K 11/33* | (2016.01) |
| *H02K 5/10* | (2006.01) |
| *H02K 5/22* | (2006.01) |
| *H02K 5/00* | (2006.01) |

(52) U.S. Cl.
CPC .............. *B60Q 1/076* (2013.01); *H02K 7/06* (2013.01); *H02K 11/33* (2016.01); *H02K 21/145* (2013.01); *H02K 37/00* (2013.01); *H02K 37/24* (2013.01); *B60Q 2200/30* (2013.01); *H02K 5/00* (2013.01); *H02K 5/10* (2013.01); *H02K 5/22* (2013.01)

(58) Field of Classification Search
CPC ...... B60Q 1/076; B60Q 2200/30; H02K 5/00; H02K 5/10; H02K 5/22; H02K 7/06; H02K 11/33; H02K 21/145; H02K 37/00; H02K 37/24
See application file for complete search history.

(56) References Cited

U.S. PATENT DOCUMENTS

| | | | |
|---|---|---|---|
| 5,689,994 A * | 11/1997 | Nagai ...................... | B23Q 1/25 310/80 |
| 8,436,498 B2 * | 5/2013 | Lee ......................... | H02K 5/225 310/49.01 |

(Continued)

FOREIGN PATENT DOCUMENTS

| | | |
|---|---|---|
| JP | 2001-054255 A | 2/2001 |
| KR | 10-2010-0038643 A | 4/2010 |

*Primary Examiner* — Stephen F Husar
(74) *Attorney, Agent, or Firm* — Saliwanchik, Lloyd & Eisenschenk

(57) ABSTRACT

A stepping motors includes a bracket including a first protruding line and a second protruding line formed on both sides, a stator and a rotor disposed on the bracket, a lead screw coupled with the rotor, and a moving member which moves back and forth according to a rotation of the lead screw, in which the moving member includes a first guide groove which slides on the first protruding line and a second guide groove which slides on the second protruding line, and the first guide groove and the second guide groove include first sections which have widths corresponding to the first protruding line and the second protruding line, respectively, and second sections which have greater widths than the first sections.

15 Claims, 6 Drawing Sheets

(56) References Cited

U.S. PATENT DOCUMENTS 9,509,203 B1 * 11/2016 Lee .................. H02K 7/06
2013/0319146 A1 * 12/2013 Lee .................. F16H 25/20
74/89.23

* cited by examiner

STEPPING MOTOR

CROSS-REFERENCE TO RELATED APPLICATION

This application claims the benefit under 35 U.S.C. §119 of Korean Patent Application No. 10-2014-0048038, filed Apr. 22, 2014, which is hereby incorporated by reference in its entirety.

BACKGROUND

Field of the Invention

The invention relates to a stepping motor which prevents movements of a moving member.

Discussion of Related Art

Stepping motors are used to precisely control a mechanical movement amount, which may be digitally controlled by a pulse. Due to this, stepping motors are used for adjusting a direction and an angle of an automotive lamp or for a light pickup of an optical disc driver, which needs precise control.

In stepping motors, a lead screw inserted in a bracket rotates, thereby linearly moving a transfer nut to control a movement amount. However, since the transfer nut is coupled only with the lead screw, the transfer nut easily moves due to external shocks in such a way that it is difficult to perform precise control.

To overcome this, a supporting rod is inserted into the transfer nut to restrain vibrations. However, it is difficult to restrain vibrations only using the supporting rod.

Also, since it is necessary to precisely adjust concentricity between a through-hole for inserting the lead screw and a through-hole for inserting the supporting rod, productivity decreases. Also, when the concentricity is not precise, stepping motors are not driven.

Also, since it is necessary to manually insert the lead screw into the bracket, an operation pace becomes decreased.

BRIEF SUMMARY

The present invention provides a stepping motor capable of reducing a frictional force between a bracket and a moving member.

The present invention also provides a stepping motor capable of being automatically assembled by modifying shapes of a bracket and a nut.

One aspect of the present invention provides stepping motor including a bracket including a first protruding line and a second protruding line formed on both sides, a stator and a rotor disposed on the bracket, a lead screw coupled with the rotor to rotate, and a moving member which moves back and forth according to a rotation of the lead screw, in which the moving member includes a first guide groove which slides on the first protruding line and a second guide groove which slides on the second protruding line, and the first guide groove and the second guide groove include first sections which have widths corresponding to the first protruding line and the second protruding line, respectively, and second sections which have greater widths than the first sections.

The bracket may include a housing disposed on one side, a supporter disposed on the other side, a first connecting bar which connects the housing with the supporter and includes the first protruding line formed therein, and a second connecting bar which connects the housing with the supporter and includes the second protruding line formed therein.

The first protruding line may be thicker than the second protruding line.

The first guide groove may include a first section formed on one side and a second section formed on the other side, and the second guide groove may include a first section formed on the other side and a second section formed on the one side based on a forward direction.

The first section and the second section of the first guide groove and the first section and the second section of the second guide groove may have widths which satisfy following Formulas 1 and 2, $$D_{21} < D_{11} < D_{12} \quad \text{[Formula 1]}$$

$$D_{21} < D_{11} < D_{22} \quad \text{[Formula 2]}$$

Herein, $D_{11}$ indicates the width of the first section of the first guide groove, $D_{12}$ indicates the width of the second section of the first guide groove, $D_{21}$ indicates the width of the first section of the second guide groove, and $D_{22}$ indicates the width of the second section of the second guide groove.

The stepping motor may include a plurality of reinforcing portions formed on outer surfaces of the first connecting bar and the second connecting bar. Also, the plurality of reinforcing portions may be connected to one another through connection portions.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Figure 1:
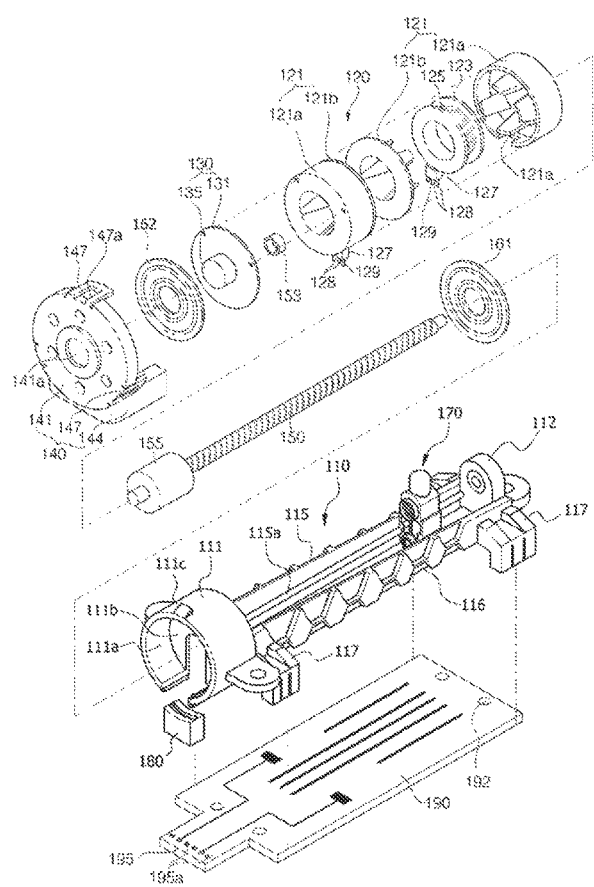
FIG. 1 is an exploded perspective view of a stepping motor according to an embodiment of the present invention.

The present invention may have various modifications and several embodiments, and exemplary embodiments thereof are shown in the drawings and will be described in detail.

It will be understood that although the terms "first", "second", etc. may be used herein to describe various components, these components should not be limited by these terms.

The terms are used merely to distinguish one element from another. For example, within the scope of the present invention, a second component may be designated as a first component, and similarly, the first component may be designated as the second component.

It will be understood that when a component is referred to as being "connected to" another component, it can be directly or indirectly connected to the other component. That is, for example, intervening components may be present.

On the contrary, when a component is referred to as being "directly connected to" another component, it will be understood that there is no intervening components.

Terms are used herein only to describe the exemplary embodiments but not to limit the present invention. Singular expressions, unless defined otherwise in contexts, include plural expressions.

In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

Also, the attached drawings will be understood as being enlarged or reduced for convenience of description.

The embodiments of the present invention will be described with reference to the drawings. Throughout the specification, like reference numerals designate like elements and a repetitive description thereof will be omitted.

Figure 2:
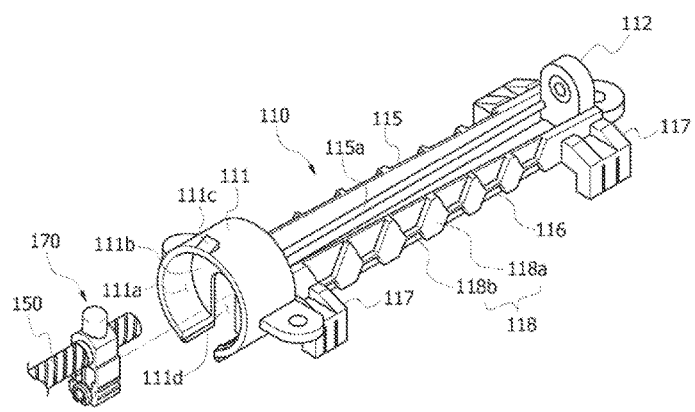
FIG. 2 is a view illustrating a state in which a moving member is inserted into a bracket according to an embodiment of the present invention.

FIG. 1 is an exploded perspective view of a stepping motor according to an embodiment of the present invention. FIG. 2. is a view illustrating a state in which a moving member 170 is inserted into a bracket 110 according to an embodiment of the present invention.

Referring to FIGS. 1 and 2, the stepping motor includes the bracket 110, a stator 120 inserted into a housing 111 of the bracket 110, a lead screw 150 rotatably coupled with the housing 111 and a supporter 112 of the bracket 110, a rotor 155 coupled with the lead screw 150 to rotate the lead screw 150, and the moving member 170 which moves back and forth according to a rotation of the lead screw 150.

The bracket 110 includes the housing 111 disposed on one side, the supporter 112 disposed on the other side opposite to the housing 111, and a first connecting bar 115 and a second connecting bar 116 which are separate from each other with a gap and connect the housing 111 with the supporter 112.

The housing 111 has one side which is open and includes an accommodating space 111a therein to allow the stator 120 to be inserted therein.

In the housing 111, an opening 111d is formed in a first surface 111b which is a bottom surface opposite to the supporter 112 and an opposite surface thereof is open. Accordingly, the moving member 170 and the lead screw 150 pass through the opening 111d and are inserted into the bracket 110.

In the case of a general method of coupling a bracket and a lead screw, since the lead screw is tilted at a top of the bracket and inserted into the bracket, an insertion is not easy and coupling is only manually performed. However, according to the embodiment of the present invention, since the moving member 170 and the lead screw 150 are inserted from the rear of the housing 111 of the bracket 110, coupling is easily performed and automation thereof is available.

The supporter 112 is disposed on the other side of the bracket 110, and one end of the lead screw 150 is fixed thereto. The supporter 112 may be separate from and opposite to the housing 111 with a gap which may be appropriately modified depending on a length of the lead screw 150.

The first connecting bar 115 and the second connecting bar 116 connect the housing 111 and the supporter 112, form sides of the bracket 110, and form a space in which the moving member 170 linearly moves.

The housing 111, supporter 112, and connecting bars 115 and 116 of the bracket 110 may be formed through injection molding but are not limited thereto and may be separately manufactured and assembled.

The first connecting bar 115 and the second connecting bar 116 are formed with protruding lines along a longitudinal direction on inner surfaces facing each other. FIGS. 1 and 2 illustrate a first protruding line 115a of the first connecting bar 115. Herein, the longitudinal direction is defined as a direction in which the first connecting bar 115 and the second connecting bar 116 extend. The protruding lines are inserted into both sides of the moving member 170 and guide back-and-forth movements of the moving member 170.

The stator 120 includes a case 121, a bobbin 123, a coil 125, a terminal plate 127, and a connection pin 128 and is fixedly inserted into the housing 111. The case 121 is provided as a pair and includes a lid 121a and a yoke 121b. Reference numerals 161 and 162 which are not described refer to elastic members having a ring shape.

The case 121 is coupled with a thrust plate 130. The thrust plate 130 includes a coupling plate 131 having a ring-shaped body and a supporting pipe 135 which protrudes from an inner circumferential surface of the coupling plate 131 and supports one end of the lead screw 150. Herein, a ball bearing 153 is inserted between the lead screw 150 and the supporting pipe 135.

The rotor 155 including a magnet is coupled with one end of the lead screw 150 located inside the stator 120. The magnet acts with the stator 120 to rotate forward and backward to rotate the lead screw 150 forward and backward as currents are selectively supplied to the coil 125.

A cover 140 includes a sealing portion 141 which is coupled with one end of the housing 111 and seals one side of the housing 111 and a cover portion 144 which is formed at an outside of the sealing portion 141 as a single body and protects a connection portion 195 of a substrate 190. A supporting hole 141a into which the supporting pipe 135 is inserted and supported is formed in the center of the sealing portion 141.

A plurality of coupling pins 147 extend from the outside of the sealing portion 141, and an insertion hole 147a is formed in the coupling pin 147. The insertion hole 147a is coupled with a coupling protrusion 111c formed on an outer circumference of the housing 111. However, such coupling configuration is merely an example for understanding and may be variously modified.

The substrate 190 is electrically connected to a coil side of the stator 120 and an external power supply, respectively, to control the stepping motor. The substrate 190 includes insertion holes 195a into which the connection pin 128 and a ground pin 129 are inserted and movement-preventing holes 192.

The movement-preventing holes 192 are coupled with movement-preventing protrusions (not shown) formed on the bracket 110, thereby preventing movements. An edge portion of the substrate 190 is fixed to a protecting rail 117 of the bracket 110 and does not protrude outside the bracket 110, thereby reducing damages of the substrate 190 caused by external shocks.

Referring to FIG. 2, reinforcing members 118 having a certain shape are formed in a longitudinal direction on outer surfaces of the first connecting bar 115 and the second connecting bar 116, respectively. In detail, each of the reinforcing members 118 includes a plurality of reinforcing portions 118a having a certain shape and a plurality of connecting portions 118b connecting the plurality of reinforcing portions 118a.

The reinforcing portion 118a maintains the strength of the connecting bars 115 and 116, thereby preventing distortion in the first protruding line 115a during an injection molding process. The connecting portion 118b improves a resin flow while the reinforcing portion 118a is injection-molded from an outer surface of each of the connecting bars 115 and 116 as a single body, thereby increasing moldability thereof.

Figure 3:
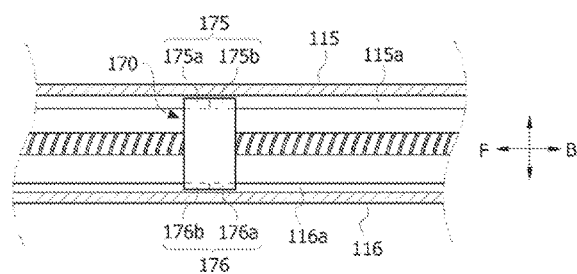
FIG. 3 is a view illustrating a state in which the moving member is guided by a protruding line of the bracket and moves back and forth according to an embodiment of the present invention.
Figure 4:
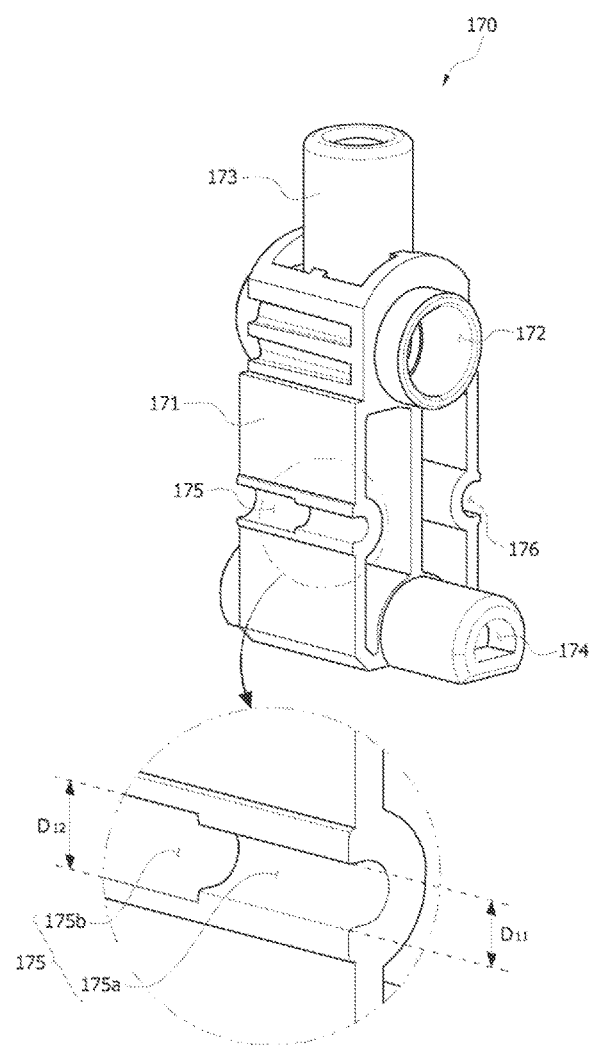
FIG. 4 is a perspective view of the moving member in one direction.
Figure 5:
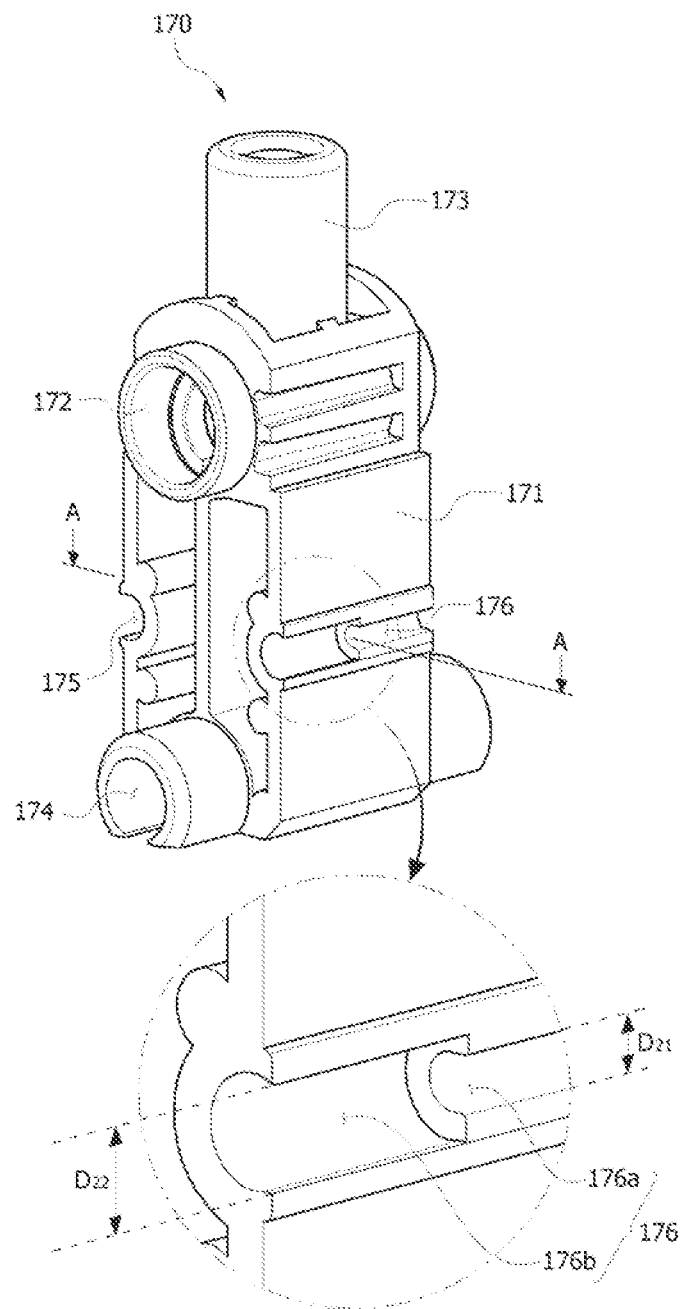
FIG. 5 is a perspective view of the moving member in another direction.
Figure 6:
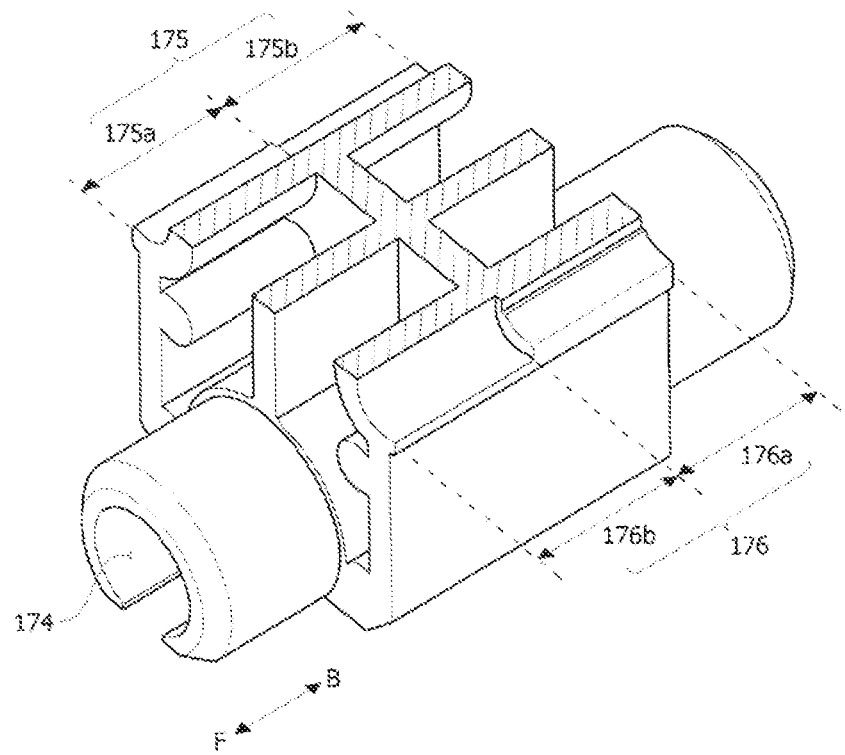
FIG. 6 is a view of the moving member in a direction of a line A-A in FIG. 5.

FIG. 3 is a view illustrating a state in which the moving member 170 is guided by the first protruding line 115a and a second protruding line 116a of the bracket 110 and moves back and forth according to an embodiment of the present invention. FIG. 4 is a perspective view of the moving member 170 in one direction. FIG. 5 is a perspective view of the moving member 170 in another direction. FIG. 6 is a view of the moving member 170 in a direction of a line A-A in FIG. 5.

Referring to FIG. 3, the moving member 170 is inserted into the first protruding line 115a formed on the first connecting bar 115 and the second protruding line 116a formed on the second connecting bar 116 to move back and forth.

Accordingly, since the moving member 170 moves while both sides thereof are being inserted into the protruding lines 115a and 116a, movements are reduced while vibrations are occurring due to external shocks. Accordingly, an abrasion loss of the moving member 170 with respect to the vibrations may be minimized.

The moving member 170 includes a first guide groove 175 which slides on the first protruding line 115a and a second guide groove 176 which slides on the second protruding line 116a.

The first guide groove 175 and the second guide groove 176 are guided by the first protruding line 115a and the second protruding line 116a, respectively, thereby allowing the moving member 170 to linearly move when the lead screw 150 rotates forward and backward, instead of rotating according to the lead screw 150.

The first guide groove 175 and the second guide groove 176 include first sections 175a and 176a in contact with the first protruding line 115a and the second protruding line 116a and second sections 175b and 176b not in contact with the first protruding line 115a and the second protruding line 116a.

The first section in contact may refer to a section designed to allow a width of a guide groove to correspond to a width of a protruding line. The second section not in contact may refer to a section in which the width of the guide groove is formed greater than one of the width of the first section and the width of the protruding line.

In a configuration described above, since only a part of the first guide groove 175 and a part of the second guide groove 176 are in contact with the first protruding line 115a and the second protruding line 116a, friction is minimized. Features described above maximize when a stepping motor is exposed to an extremely low or high temperature in such a way that a bracket contracts or expands.

The first section 175a of the first guide groove 175 and the first section 176a of the second guide groove 176 are in contact with the protruding lines 115a and 116a in mutually different positions. That is, in FIG. 3, based on a forward direction F, the first section 175a of the first guide groove 175 is formed on one side (front) and the first section 176a of the second guide groove 176 is formed on the other side (rear).

Identically, based on the forward direction F, the second section 175b of the first guide groove 175 is formed on the one side (front) and the first section 176a of the second guide groove 176 is formed on the other side (rear).

Accordingly, based on the forward direction F, a point in which the first section 175a of the first guide groove 175 is in contact with the first protruding line 115a is located in front of a point in which the first section 176a of the second guide groove 176 is in contact with the second protruding line 116a.

According to the configuration, even though the second section 175b of the first guide groove 175 and the second section 176b of the second guide groove 176 are not in contact with the first protruding line 115a and the second protruding line 116a, vibrations of the moving member 170 are minimized.

Referring to FIGS. 4 and 5, the moving member 170 includes a body 171 and a coupling protrusion 173. An automotive head lamp is assembled with the coupling protrusion 173 of the stepping motor, thereby forming a head lamp assembly.

As a configuration of the automotive head lamp, a publicly known configuration may be applied as it is and a further description thereof will be omitted. For example, the configuration of the head lamp includes a light source and a reflecting plate which fixes the light source and guides a proceeding direction of light.

The body 171 includes a through-hole 172 into which the lead screw 150 penetrates and is inserted and an accommodating groove 174 into which the magnet is inserted. The first guide groove 175 and the second guide groove 176 are formed on both sides of the body 171. The first guide groove 175 and the second guide groove 176, as described above, slide along the first protruding line 115a and the second protruding line 116a.

A width $D_{11}$ of the first section 175a of the first guide groove 175 is formed narrower than a width $D_{12}$ of the second section 175b. A width $D_{21}$ of the first section 176a of the second guide groove 176 is firmed narrower than a width $D_{22}$ of the second section 176b.

At this time, the first section 175a of the first guide groove 175 does not need to have the same width as the first section 176a of the second guide groove 176. The second section 175b of the first guide groove 175 also does not need to have the same width as the second section 176b of the second guide groove 176.

Referring to FIG. 6, based on the forward direction F, the first section 175a of the first guide groove 175 is disposed in the front and the first section 176a of the second guide groove 176 is disposed in the rear.

Identically, based on the forward direction F, the second section 175b of the first guide groove 175 is disposed in the front and the second section 176b of the second guide groove 176 is disposed in the rear. Throughout the specification, a configuration in which respective sections do not face each other and are alternately disposed in a diagonal direction is defined as an asymmetrical disposition.

Figure 7:
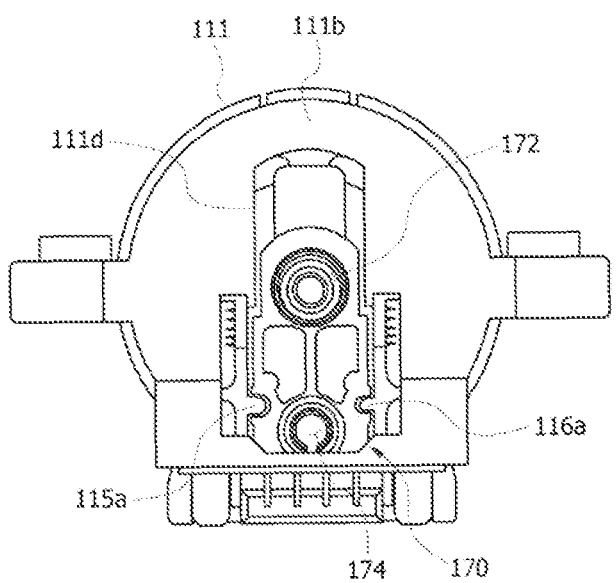
FIG. 7 is a view illustrating a state in which the moving member is inserted into the bracket according to an embodiment of the present invention.
Figure 8:
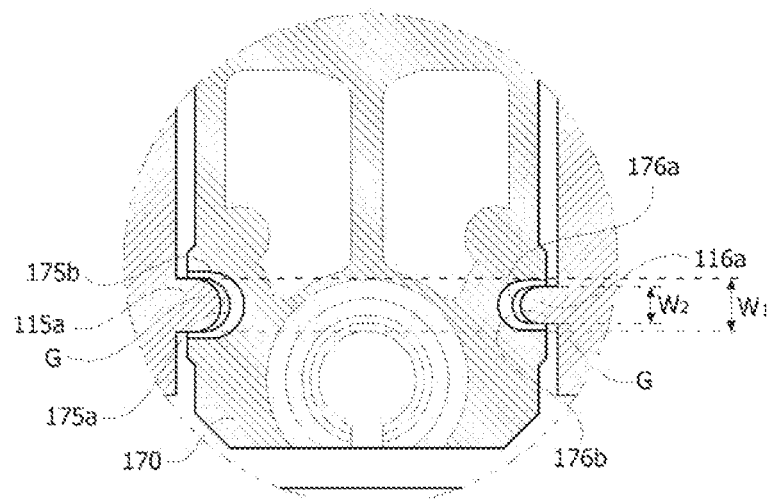
FIG. 8 is an enlarged view illustrating a portion B shown in FIG. 7.

FIG. 7 is a view illustrating a state in which the moving member 170 is inserted into the bracket 110 according to an embodiment of the present invention. FIG. 8 is an enlarged view illustrating a portion B shown in FIG. 7.

A thickness W1 of the first protruding line 115a and a thickness W2 of the second protruding line 116a may be formed mutually different in such a way that a width of the first section 175a of the first guide groove 175 and a width of the first section 176a of the second guide groove 176 may be formed mutually different.

For example, the thickness W1 of the first protruding line 115a may be greater than the thickness W2 of the second protruding line 116a. Accordingly, to be in contact with each protruding line, the width of the first section 175a of the first guide groove 175 and the width of the first section 176a of the second guide groove 176 are adjusted.

According to the configuration described above, the moving member 170 may be inserted into the bracket 110 only in a predetermined direction in which sizes of the protruding lines and the guide grooves fit each other. Accordingly, it is prevented that a product malfunctions because the magnet inserted into the accommodating groove 174 is not inserted in the predetermined direction.

Since the first sections 175a and 176a are allowed to have smaller widths than the second sections 175b and 176b and the width of the first section 175a of the first guide groove 175 is greater than the width of the first section 176a of the second guide groove 176, the first section 175a and the second section 175b of the first guide groove 175 and the first section 176a and the second section 176b of the second guide groove 176 may satisfy following Formulas 1 and 2.

$$D_{21}<D_{11}<D_{12} \qquad \text{[Formula 1]}$$

$$D_{21}<D_{11}<D_{22} \qquad \text{[Formula 2]}$$

Herein, $D_{11}$ indicates the width of the first section 175a of the first guide groove 175, $D_{12}$ indicates the width of the second section 175b of the first guide groove 175, $D_{21}$ indicates the width of the first section 176a of the second guide groove 176, and $D_{22}$ indicates the width of the second section 176b of the second guide groove 176.

Gaps G are formed between the protruding lines 115a and 116a and the first sections 175a and 176a. The gaps G allow smooth sliding of the guide grooves 175 and 176. When the protruding lines 115a and 116a are inserted into the first sections 175a and 176a without the gaps G, sliding thereof is not smooth due to a frictional force. When tips occur at ends of the protruding lines 115a and 116a, since the guide grooves 175 and 176 do not slide, the stepping motor may not operate.

According to the embodiments of the present invention, since a moving member slides on a protruding line of a bracket and linearly moves, a movement caused by external vibrations may be prevented and an abrasion loss may be minimized.

Also, since the moving member is inserted only in a preset direction, a malfunction of the motor is prevented and an automatic assembling process is available.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A stepping motor comprising:
   a bracket comprising a first protruding line and a second protruding line formed on both sides;
   a stator and a rotor disposed on the bracket;
   a lead screw coupled with the rotor; and
   a moving member which moves back and forth according to a rotation of the lead screw,
   wherein the moving member comprises a first guide groove which slides on the first protruding line and a second guide groove which slides on the second protruding line, and
   wherein the first guide groove and the second guide groove comprise first sections which have widths corresponding to the first protruding line and the second protruding line, respectively, and second sections which have greater widths than the first sections.

2. The stepping motor of claim 1, wherein the bracket comprises:
   a housing disposed on one side;
   a supporter disposed on the other side;
   a first connecting bar which connects the housing with the supporter and comprises the first protruding line formed therein; and
   a second connecting bar which connects the housing with the supporter and comprises the second protruding line formed therein.

3. The stepping motor of claim 1, wherein the first protruding line is thicker than the second protruding line.

4. The stepping motor of claim 1, wherein the first guide groove comprises a first section formed on one side and a second section formed on the other side, and
   wherein the second guide groove comprises a first section formed on the other side and a second section formed on the one side.

5. The stepping motor of claim 1, wherein the first section and the second section of the first guide groove and the first section and the second section of the second guide groove have widths which satisfy following Formulas 1 and 2, $$D_{21}<D_{11}<D_{12} \qquad \text{[Formula 1]}$$

$$D_{21}<D_{11}<D_{22} \qquad \text{[Formula 2]}$$

wherein $D_{11}$ indicates the width of the first section of the first guide groove, $D_{12}$ indicates the width of the second section of the first guide groove, $D_{21}$ indicates the width of the first section of the second guide groove, and $D_{22}$ indicates the width of the second section of the second guide groove.

6. The stepping motor of claim 2, wherein the housing comprises an opening through which the moving member passes.

7. The stepping motor of claim 6, comprising a cover which is connected to the housing and seals the stator.

8. The stepping motor of claim 2, comprising a plurality of reinforcing portions formed on outer surfaces of the first connecting bar and the second connecting bar.

9. The stepping motor of claim 8, wherein the plurality of reinforcing portions are connected to one another through connection portions.

10. The stepping motor of claim 1, comprising a substrate coupled with the bracket.

11. The stepping motor of claim 10, wherein the bracket comprises protecting rails coupled with an edge portion of the substrate.

12. The stepping motor of claim 1, wherein the moving member comprises a body comprising the first guide groove and the second guide groove formed thereon.

13. The stepping motor of claim 12, wherein the moving member comprises a coupling portion formed on a top of the body.

14. The stepping motor of claim 12, wherein the body comprises:
   a through-hole into which the lead screw is inserted; and an accommodating groove into which a magnet is inserted.

15. A head lamp assembly comprising:
the stepping motor according to claim 1; and
a head lamp coupled with the moving member of the stepping motor.

* * * * *